United States Patent [19]
Baba et al.

[11] 3,777,273
[45] Dec. 4, 1973

[54] ANGULAR POSITION DETECTOR USING MAGNETIC ELEMENTS

[75] Inventors: Kosaku Baba, Yokohama City; Kiyoshi Wazawa, Fujisawa City, both of Japan

[73] Assignee: Nissan Motor Company Limited, Yokohama City, Japan

[22] Filed: Apr. 27, 1972

[21] Appl. No.: 248,192

[30] Foreign Application Priority Data
Nov. 8, 1971 Japan.............................. 46/88269

[52] U.S. Cl.................... 329/200, 324/42, 329/198, 332/51 R
[51] Int. Cl. ............................................. H03d 1/46
[58] Field of Search.................. 329/100, 193, 198, 329/199, 202; 332/26, 51 R; 324/0.5 E, 117 R, 42, 45, 48

[56] References Cited
UNITED STATES PATENTS

| | | | |
|---|---|---|---|
| 3,366,909 | 1/1968 | Hini et al.......................... | 324/45 X |
| 3,413,573 | 11/1968 | Nathanson et al................ | 332/26 X |
| 3,112,464 | 11/1963 | Ratajski et al..................... | 324/45 X |
| 2,930,974 | 3/1960 | From .................................. | 324/48 |
| 930,780 | 8/1909 | Murgas........................... | 329/200 X |

Primary Examiner—Alfred L. Brody
Attorney—John Lezdey

[57] ABSTRACT

An angular position detector comprising means for establishing a magnetic field wherein a magnetic flux distributes in such a manner as to vary in accordance with the angular position of a rotary shaft. At least one pair of magnet effective elements each having a parameter varied in accordance with a density of a magnetic flux passing therethrough are placed in the magnetic field and incorporated in an electric circuit. The electric circuit connects the magnet effective elements in series to each other and impress a d-c voltage which is then divided into a voltage representing the variation of the parameter of the elements, namely, the angular position of the rotary shaft.

4 Claims, 7 Drawing Figures

ANGULAR POSITION DETECTOR USING MAGNETIC ELEMENTS

This invention relates to a detector for use in a motor vehicle and more particularly to a detector for detecting an angular position of a shaft of a component in a motor vehicle such as throttle valve shaft and steering column.

For the purpose of improvement of drivability and of reduction of toxic contents in the exhaust gases, electric fuel injection systems, electric automatic transmission systems etc. are recently developed functioning in accordance with various conditions of components in a motor vehicle.

Various detectors for detecting an angular position of a shaft of a component in a motor vehicle are therefore developed one of which utilizes a potentiometer or voltage divider. Although the detector including the potentiometer is advantageous in its economical cost and compact construction, it is not fully acceptable because a slidable contact between a slidable tap and a resistor of the potentiometer is susceptible to shocks and vibrations exerted on the detector and to chemical compounds involved in ambient atomosphere.

Another detector is a variable inductance type detector which comprises an oscillator, a coupling coil incorporated with a movable core, a rectifier etc. This type detector is therefore costly and large in volume because of so many parts thereof and, furthemmore, is susceptible to atmospheric temperature because some of the above-listed parts includes crystal elements sensitive to heat, such as, a transistor.

It is therefore an object of this invention to provide an improved detector for detecting an angular position of a rotary shaft.

It is another object of the invention to provide an angular position detector with high reliability and durability.

It is still a further object of the invention to provide an angular position detector which is economical and compact.

It is another object of the invention to provide an angular position detector which can normally operate notwithstanding variation of atmospheric temperature.

It is still a further object of the invention to provide an angular position detector usable for detecting the throttle valve shaft position of a motor vehicle engine.

Further objects, features and advantages of this invention will become apparent from a consideration of the following description, the appended claims, and the accompanying drawings in which:

Corresponding characters of reference designated like parts in the views.

The angular position detector of this invention is particularly adapted to be utilized and will be described specifically for use with motor vehicle. However, it is to be understood that the features of the invention may be utilized with any other apparatus. In the case of a motor vehicle use, the device of the invention may be utilized in connection with the throttle valve shaft or the steering column. However, for the simplicity, the device will be described for use in conjunction only with throttle valve shaft.

Figure 1:
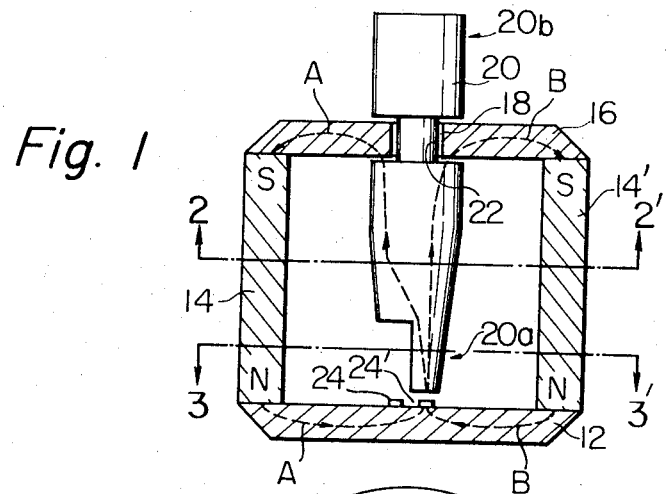
FIG. 1 is a sectional view showing an embodiment of a device according to this invention.

Referring now to the drawings and particularly to FIG. 1 thereof, there is illustrated an angular position detector 10 for detecting a rotary position or motion of the throttle valve shaft, which comprises a first plate magnetic member 12 made of a magnetic material such as iron and preferably shaped as a circular truncated cone. A pair of columnar magnetic members 14 and 14' stand through N-pole thereof on a major surface of the first plate magnetic member 12. A second plate magnetic member 16 made of a magnetic material and preferably formed into a circular truncated cone is mounted on S-poles of the magnets 14 and 14'. The second plate magnetic member 16 has a circular aperture 18 extending from one major surface to the other of the member 16. A columnar member 20 is coupled through its intermediate recessed portion 22 with the aperture 18 of the second plate magnetic member 16. The member 20 has one end portion 20a which is formed into an eccentric configuration and preferably a semicircular. Being thus constructed, a pair of magnetic circuits are formed by the magnets 14 and 14', magnetic members 12 and 16, and rotary shaft 20, so that magnet fluxes are produced each extending from the N-pole of the magnet 14 or 14' through the member 12, rotary shaft 20 and member 16 to the S-pole of the magnet 14 or 14'. A pair of magnet effective elements 24 and 24' each having a property varied in accordance with a density of a magnetic flux passing therethrough are placed as spaced from each other on the major surface of the first plate magnetic member 12 and under the end portion 20a of the rotary shaft 20. The elements are preferably positioned symmetrically with respect of the axis of rotation of the rotary shaft 20. A magnetic resistive element, a magnetic diode or a magnetic Hall element having property varied by a magnetic force may be utilized as the magnet effective element 24 or 24'. The thus placed magnet effective elements 24 and 24' are subject to a magnetic field established in a gap between the rotary shaft 20 and the member 12 which field is caused by the magnetic fluxes A and B. The other end 20b of the rotary shaft 20 is, on the other hand, adapted to connect with the throttle valve shaft (not shown) so that the shaft 20 rotates in accordance with the rotation of the throttle shaft.

Figure 2:
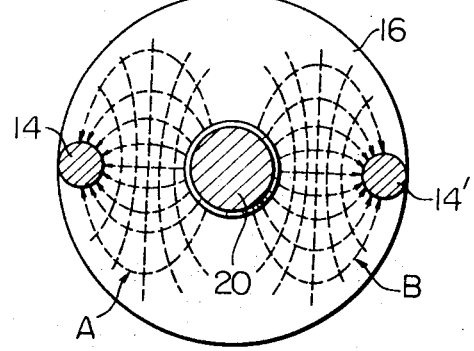
FIG. 2 is a cross-sectional view taken from a line 2—2 shown in FIG. 1.

In FIG. 2, the magnetic fluxes A and B distribute in the member 16 as shown by broken lines. It is apparent that the distribution of the magnetic fluxes A and B are symmetrical because of the symmetric construction of the upper portion of the detector 10.

Figure 3:
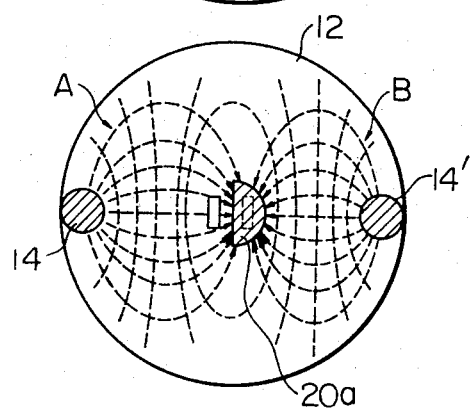
FIG. 3 is a cross-sectional view taken from a line 3—3, shown in FIG. 1.

In FIG. 3, the magnetic fluxes A and B distribute in the member 12 as shown by broken lines. It should be noted that the distribution of the magnetic fluxes A and B is distorted because of the eccentric configuration of the end portion 20a of the rotary shaft 20. Furthermore, it is to be understood that, when the rotary shaft 20 is rotated due to the motion of the throttle valve shaft, the distorted distribution of the fluxes is varied due to the movement of the end face 20a and, at the same time, the distribution of the magnetic flux of the magnetic field in the gap is varied in accordance with the rotation of the rotary shaft 20. The resistance of the element 24 and 24' therefore are varied in accordance with the rotation of the rotary shaft 20. The variation of the resistance of the magnet effective elements 24 and 24' accordingly are representative of an angular position or a rotary motion of the throttle valve shaft.

Figure 4:
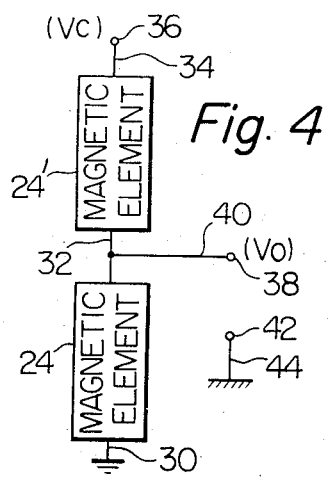
FIG. 4 is a diagram illustrating a circuit arrangement for the particular device.

The variations of the resistances of the elements 24 and 24' are detected through an electric circuit shown in FIG. 4, wherein one terminal of the element 24 is ground through a conductor 30, and the other terminal is connected through a conductor 32 to one terminal of the element 24'. The other terminal of the element 24' is connected through a conductor 34 to a terminal 36 to which a d-c power source (not shown) having a voltage $V_c$ is connected for flowing a certain magnitude of current through the elements 24 and 24'. One output terminal 38 is connected through a conductor 40 to the conductor 32. Another output terminal 42 is grounded through a conductor 44. Through the above arrangement, the voltage $V_c$ is divided into a voltage $Vo$ which appears across the output terminals 38 and 42. The voltage $Vo$ varied in accordance with the variation of the resistances of the elements 24 and 24'. As a result, the variation of the voltage represents the angular position of the throttle valve shaft, or the throttle opening. The variation of the voltage $Vo$ is therefore utilized as a voltage signal representing the throttle opening for various systems such as automatic transmission systems and fuel injection systems.

In this instance, it is to be noted that the detector of this invention does not affected by the ambient temperature thereof because the output voltage of the detector is governed only by a ratio of the resistances of the elements 24 and 24'.

Figure 5:
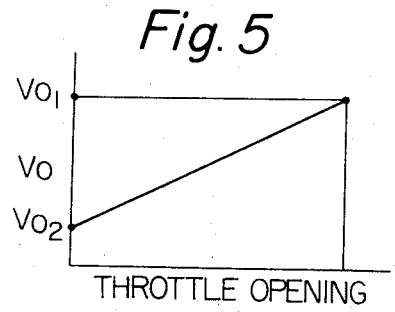
FIG. 5 is a view showing a characteristics of the device of the invention.

The variation of the output voltage $Vo$ in FIG. 4 is shown in a graph of FIG. 5 wherein the axes of abscissa and ordinate respectively represent the throttle opening and the voltage $Vo$. As shown, the voltage $Vo$ varies in proportion to the throttle opening from a value $Vo2$ to another value $Vo1$. The values $Vo1$ and $Vo2$, for example, corresponds to the closed and fully open throttle angular positions.

Figure 6:
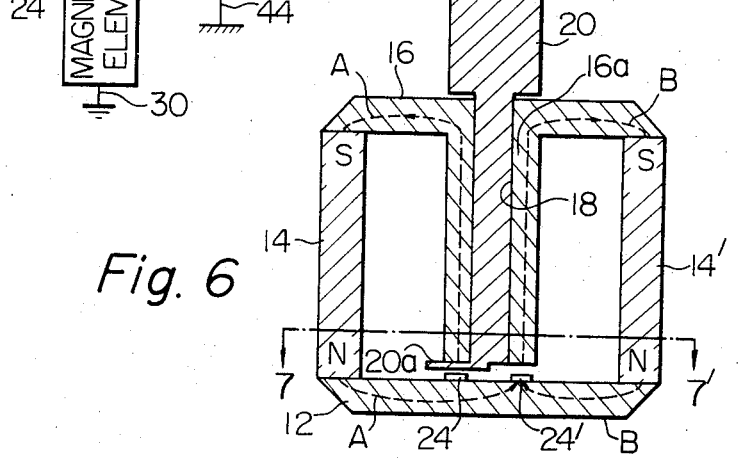
FIG. 6 is a view showing another embodiment of the device of this invention.

In FIG. 6, another embodiment of this invention is illustrated which comprises a first plate magnetic member 12 made of a magnetic material and preferably formed into a circular truncated cone. A pair of magnets 14 and 14' stand at N-pole thereof on a major surface of the first plate magnetic member 12. A second plate magnetic member 16 made of a magnetic material is mounted on S-poles of the magnets 14 and 14'. The member 16 has a columnar projection 16a projected toward the first magnetic member 12 so as to form a narrow gap between the end face of the projection 16a and the major surface of the member 12. Through the projection 16a and member 16 is formed a cylindrical bore 18 into which a rotary shaft 20 made of a non-magnetic material is rotatably inserted. The rotary shaft 20 has one end portion 20a formed into an eccentric configuration preferably a semicircular which extends over the end face of the projection 16a. Being thus constructed, a pair of magnetic circuits are formed and magnetic fluxes A and B extend as indicated by broken lines in the same manner as the embodiment of FIG. 1. A pair of magnetic elements 24 and 24' each having a resistance varied in accordance with a density of a magnetic flux passing therethrough are placed as spaced from each other on the major surface of the first plate magnetic member 12 and under the end surface of the projection 16a. The elements 24 and 24' may be the same as the element in the detector of FIG. 1. In this instance, it is to be noted that the eccentrically configurated nonmagnetic and portion 20a interrupt the magnetic flux to extend through the gap whereby the distribution of the magnetic flux in the gap is varied by the movement of the portion 20a, namely, the rotation of the rotary shaft 20. The rotary shaft 20 is adapted to connect through the other end 20b with the throttle valve shaft (not shown) and to rotate together with the throttle valve shaft. The magnetic elements 24 and 24' are incorporated with the same electric circuit as FIG. 4 and the variations of the resistances of the elements 24 and 24' are converted into an electrical signal.

Figure 7:
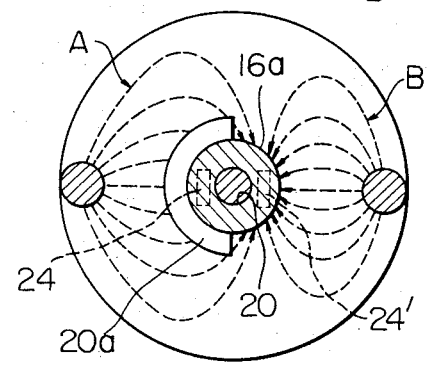
FIG. 7 is a sectional view taken from a line 7—7' in FIG. 6.

In FIG. 7, the magnetic fluxes A and B distribute in the member 12 as shown by broken lines. It is apparent that the distribution of the magnetic fluxes A and B is assymmetrical with respect to the axis of the axis of rotation of the rotary shaft 20 because of the interruption of the eccentrically configurated end portion 20a.

It is apparent from the above description that the angular position detector according to this invention is capable of precisely detecting an angular position of a shaft of a component in a motor vehicle notwithstanding variation of the ambient temperature and shocks and vibrations exerted thereon. Furthermore, it is economical in cost and compact in construction.

It will be understood that this invention is not to be limited to the exact constructions shown and described and that various changes and modifications may be made without departing from the spirit and scope of this invention as defined in the appended claims.

What is claimed is:

1. A detector for producing an electrical signal representing an angular position of a rotary shaft, comprising magnetic circuit means having a first and second magnetic plates disposed in spaced relationship and with a plurality of magnetic members disposed between said first and second magnetic plates, said magnetic members having poles arranged to establish an unidirectional magnetic field in said magnetic circuit means, means rotatably supporting the rotary shaft in said second magnetic plate and with said shaft having an eccentrically faced end portion located adjacent to a larger surface of said first plate, at least one pair of magnetically sensitive elements each having a property varied in accordance with magnetic flux density passing therethrough and disposed on the larger surface of said first magnetic plate in spaced relationship in a direction vertical to the magnetic flux passing through said elements, and an electrical circuit connecting said elements in series and applying an electrical potential across both the serially connected elements to develope a potential at a junction between said elements and to detect the variation of this potential varied in accordance with the variation of the property of said elements whereby said variation of potential corresponds to the angular position of said rotary shaft.

2. A detector according to claim 1, wherein said means includes an aperture in said second plate, in which said rotary shaft is rotatably disposed.

3. A detector according to claim 1, wherein said magnetically sensitive elements are positioned symmetrically with respect to an axis of said rotary shaft.

4. A detector according to claim 3, wherein said eccentrically faced end portion of said rotary shaft has a semicircular cross section.

* * * * *